(12) United States Patent
Chen (10) Patent No.: US 7,066,595 B1
(45) Date of Patent: Jun. 27, 2006

(54) TEMPLE ASSEMBLY FOR A PAIR OF GLASSES

(76) Inventor: Chin-Lung Chen, No. 12, Ta Pu Street, Tainan City (TW)

( * ) Notice: Subject to any disclaimer, the term of this patent is extended or adjusted under 35 U.S.C. 154(b) by 0 days.

(21) Appl. No.: 11/011,297

(22) Filed: Dec. 13, 2004

(51) Int. Cl.
*G02C 5/16* (2006.01)

(52) U.S. Cl. .................. 351/113; 351/111; 351/153; 16/228

(58) Field of Classification Search .......... 351/113, 351/111, 153, 41, 114; 16/228; 2/450
See application file for complete search history.

(56) References Cited

U.S. PATENT DOCUMENTS

| | | | | |
|---|---|---|---|---|
| 5,165,060 A | * | 11/1992 | Huang | 351/113 |
| 5,406,339 A | * | 4/1995 | Chen | 351/153 |
| 6,353,965 B1 | * | 3/2002 | Lo | 16/228 |
| 6,585,371 B1 | * | 7/2003 | Lin | 351/113 |

* cited by examiner

*Primary Examiner*—Hung Xuan Dang
(74) *Attorney, Agent, or Firm*—Charles E. Baxley (57) ABSTRACT

A temple assembly for a pair of glasses includes a temple, a pivotal member, a positioning member, a bolt mounted in a receptacle of the temple for retaining the positioning member, and an elastic element mounted in the receptacle and between the positioning member and a head of the bolt. An end of the pivotal member is pivotally connected to an end of a frame of a pair of glasses. The other end of the pivotal member is mounted in the receptacle of the temple and has a reduced section. The positioning member is mounted to the second end of the pivotal member and includes a peripheral edge that is deformed and in tight contact with a perimeter wall delimiting the receptacle of the temple. The deformed portion of the peripheral edge of the positioning member is in space above the reduced portion of the pivotal member.

6 Claims, 11 Drawing Sheets

TEMPLE ASSEMBLY FOR A PAIR OF GLASSES

BACKGROUND OF THE INVENTION

1. Field of the Invention

The present invention relates to a temple assembly. In particular, the present invention relates to a temple assembly for a pair of glasses.

2. Description of the Related Art

Figure 6:
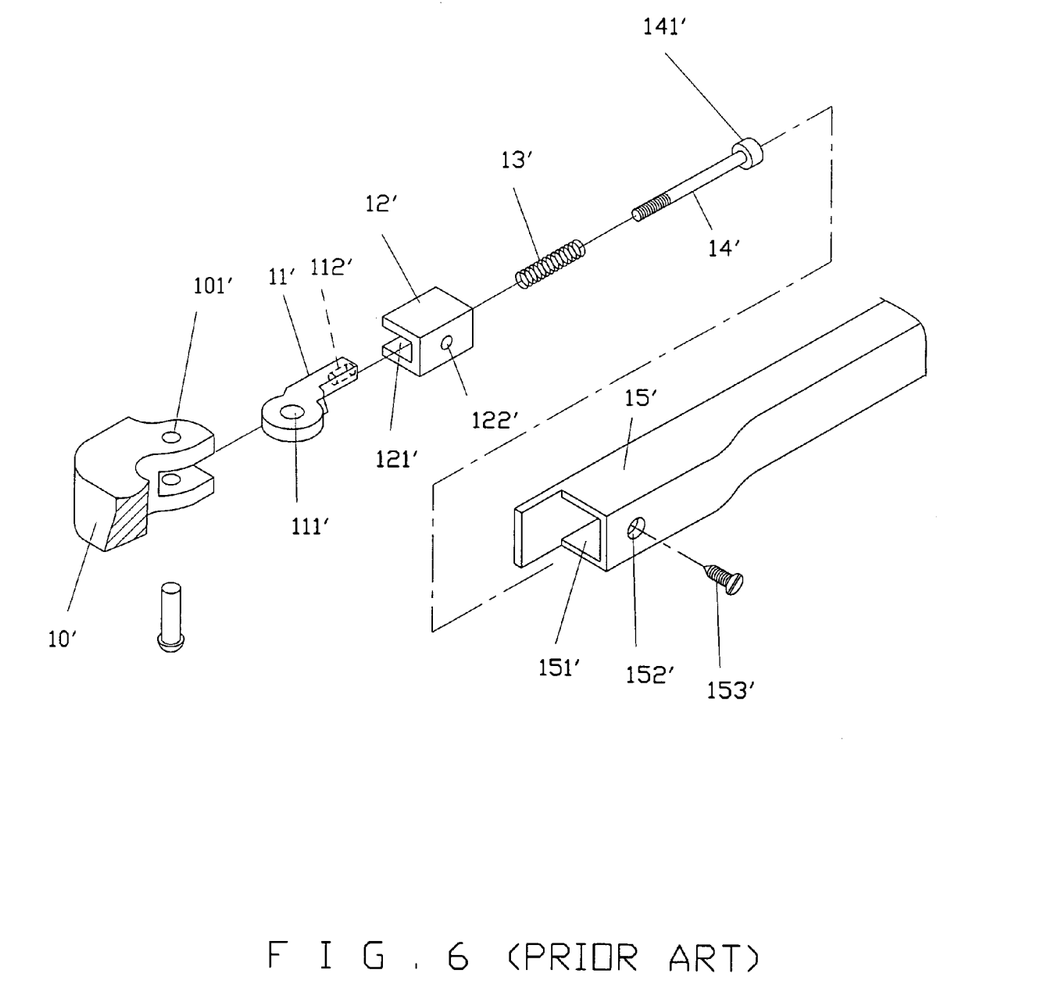
FIG. 6 is an exploded perspective view of a conventional temple assembly for a pair of glasses.
Figure 7:
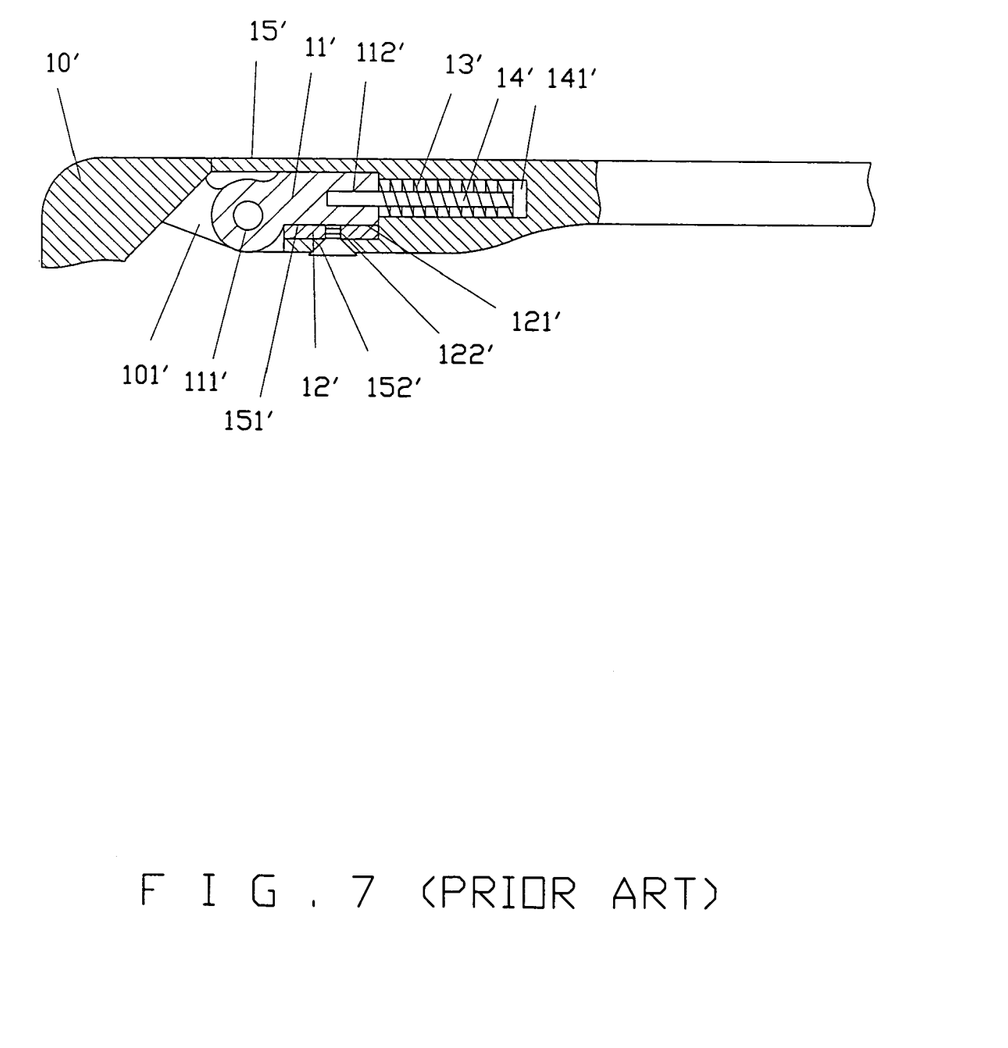
FIG. 7 is a side view, partly sectioned, of the temple assembly in FIG. 6.

FIGS. 6 and 7 of the drawings illustrate a conventional temple assembly for a pair of glasses. The temple assembly comprises a pivotal member 11', a U-shaped block 12', an elastic element 13', a bolt 14', and a temple 15'. The pivotal member 11' includes an end 111' pivotally connected to a pivotal portion 101' on an end of a frame 10' of a pair of glasses. A screw hole 112' is defined in the other end of the pivotal member 11' for threadedly engaging with a threaded portion of the bolt 14'. The U-shaped block 12' includes a screw hole 122' in an intermediate portion thereof. Further, the U-shaped block 12' defines a central groove 121' through which the bolt 14' extends. The elastic element 13' is mounted around the bolt 14' and includes two ends respectively abutting against the U-shaped block 12' and a head 141' of the bolt 14'. The temple 15' includes a receptacle 151' in an end thereof for receiving the U-shaped block 12'. The U-shaped block 12' is fixed in the receptacle 151' by extending a screw 153' through a mounting hole 152' in the end of the temple 15' and the screw hole 122' of the U-shaped block 12'. When the temple 15' is pivoted, the U-shaped block 12' compresses the elastic element 13'.

However, a mounting hole 152' has to be formed in the temple 15' and a screw 153' is required to fix the U-shaped block 12' in the receptacle 151'. The appearance is not aesthetically pleasing in view of the exposed mounting hole 152' and the screw 153'. Further, alignment of the mounting hole 152' of the temple 15' and the screw hole 122' of the U-shaped block 12' is not easy during assembly. Further, the size of the temple 15' is increased, as the U-shaped block 12' receiving the pivotal member 11' is accommodated in the receptacle 151' of the temple 15'. The bulky temple 15' is a great limitation to the designs of the glasses.

Figure 8:
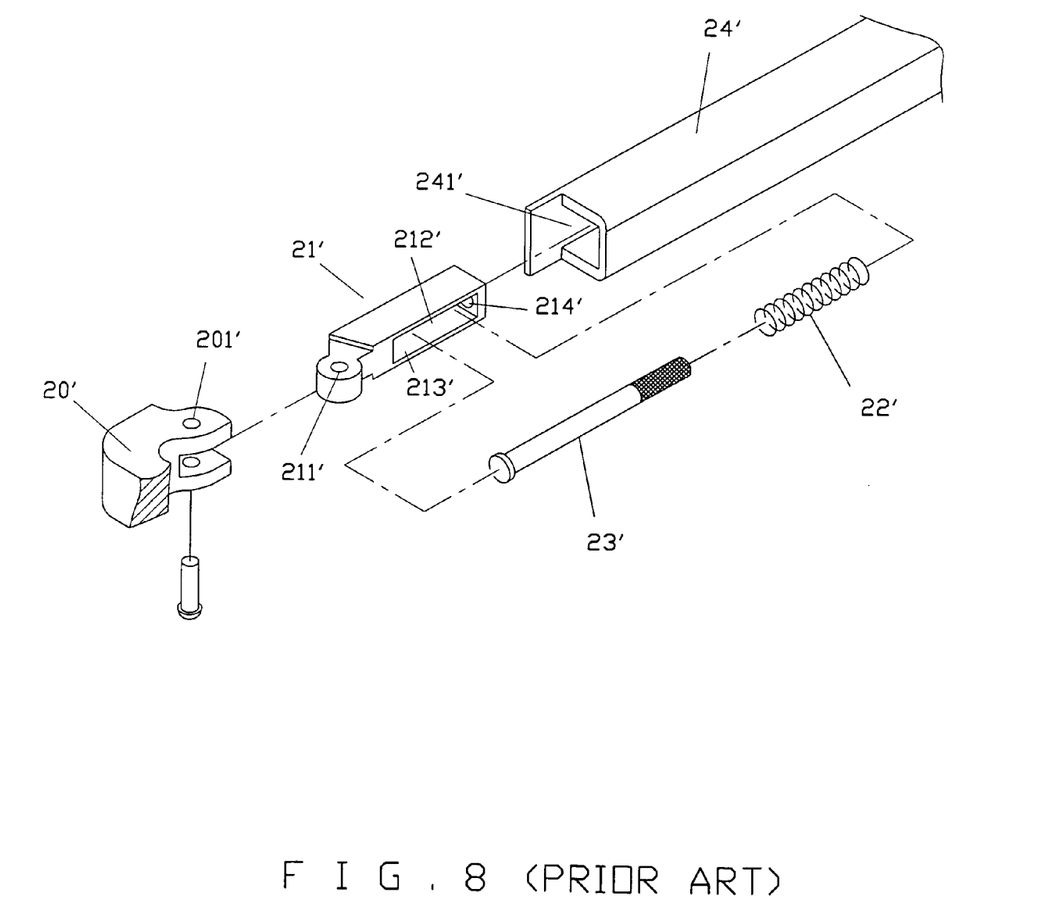
FIG. 8 is an exploded perspective view of another conventional temple assembly for a pair of glasses.
Figure 9:
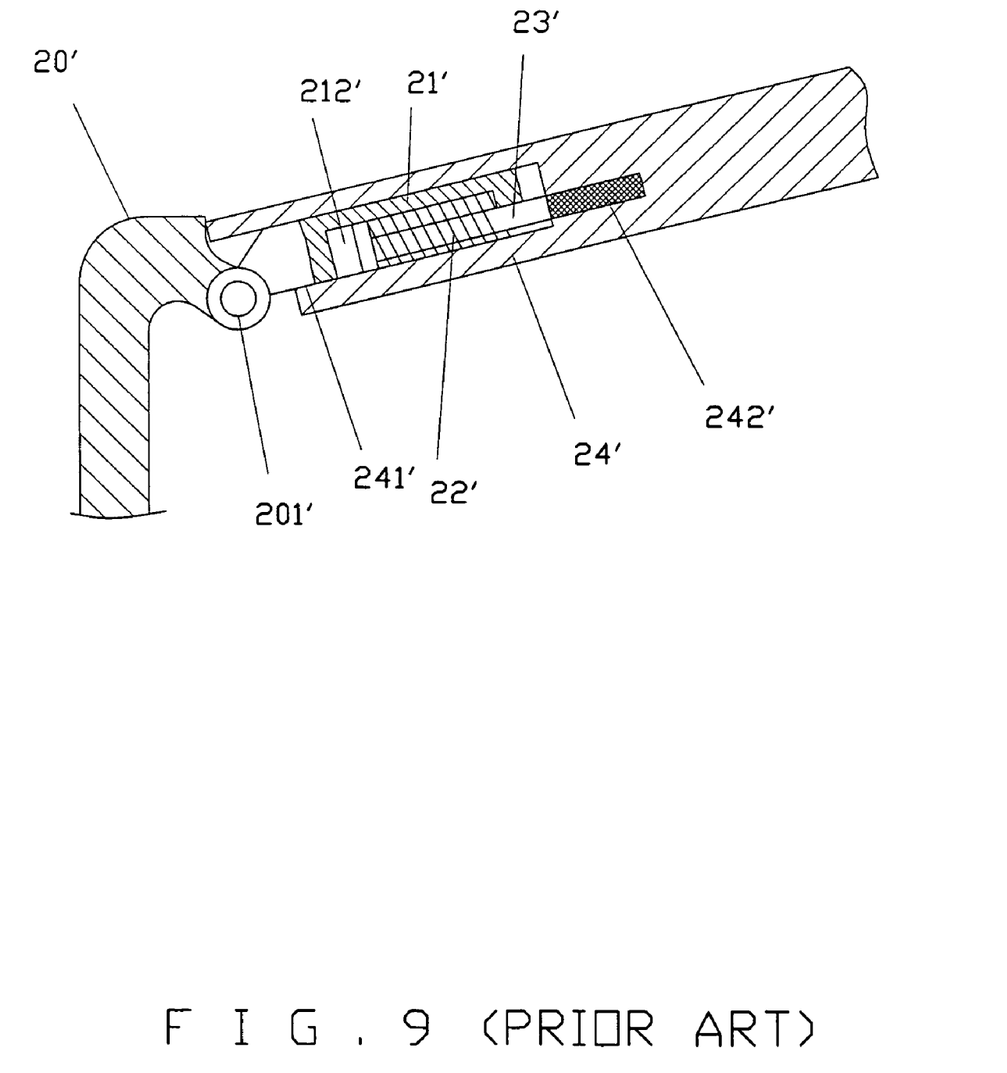
FIG. 9 is a sectional view of the temple assembly in FIG. 8.

FIGS. 8 and 9 illustrate another conventional temple assembly comprising a pivotal member 21', an elastic element 22', a bolt 23', and a temple 24'. The pivotal member 21' includes an end 211' pivotally connected to a pivotal portion 201' on an end of a frame 20' of a pair of glasses. A receiving portion 212' for receiving the elastic element 22' is provided on the other end of the pivotal member 21'. The receiving portion 212' includes a groove 213' and a hole 214' through which the bolt 23' extends. The temple 24' includes a receptacle 241' for accommodating the bolt 23'.

However, when assembling the bolt 23', the elastic element 22' has to be firstly mounted around the bolt 23', and an end of the bolt 23' is then inserted into the groove 213' and extended through the hole 214' into a blind hole 242' in an end wall delimiting the receptacle 241'. Insertion and positioning of the bolt 23' are not easy. Further, the receptacle 241' of the temple 24' must be large enough to receive the bulky pivotal member 21', causing limitation to the designs of glasses while failing to provide an aesthetically pleasing appearance.

Figure 10:
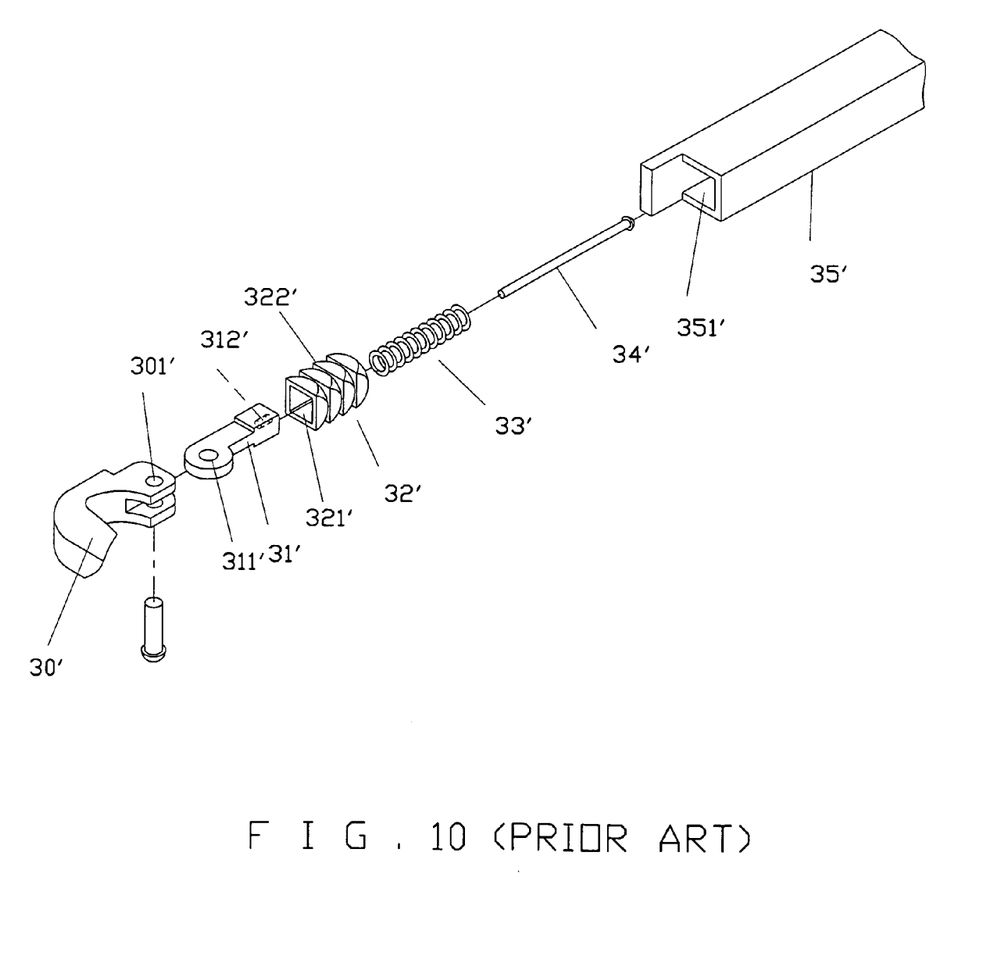
FIG. 10 is an exploded perspective view of a further conventional temple assembly for a pair of glasses.
Figure 11:
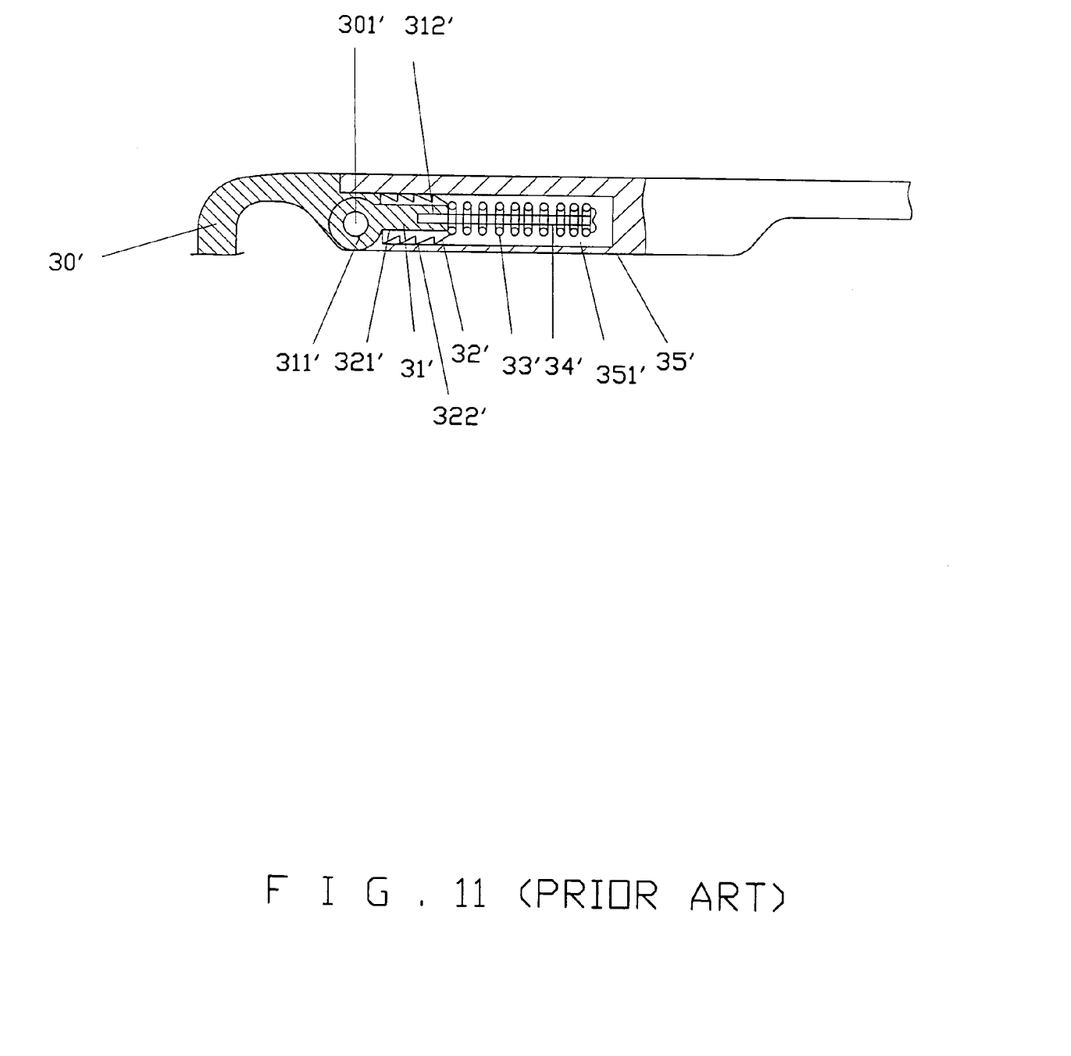
FIG. 11 is a side view, partly sectioned, of the temple assembly in FIG. 10.

FIGS. 10 and 11 illustrate a further conventional temple assembly comprising a pivotal member 31', a positioning member 32', an elastic element 33', a bolt 34', and a temple 35'. The pivotal member 31' includes an end 311' pivotally connected to a pivotal portion 301' on an end of a frame 30' of a pair of glasses. A screw hole 312' is defined in the other end of the pivotal member 31'. The positioning member 32' includes a central hole 321' for receiving the pivotal member 31'. The positioning member 32' further includes an outer threading 322'. The temple 35' includes a receptacle 351'. In assembly, the elastic element 33' is mounted around the bolt 34' that has an end inserted into the screw hole 312' of the pivotal member 31'. The positioning member 32' is inserted into the receptacle 351', with the outer threading 322' being engaged with a perimeter wall delimiting the receptacle 351' and with two ends of the elastic element 33' respectively abutting against the positioning member 32' and an end wall delimiting the receptacle 351'.

However, it is difficult for the outer threading 322' of the positioning member 32' to bit into the smooth perimeter wall delimiting the receptacle 351'. Thus, the positioning member 32' could not provide a reliable support for the elastic element 33' and is apt to become loosened and disengaged. Further, the positioning member 32' must be large enough to accommodate the pivotal member 31' such that the size of the temple 35' receiving the positioning member 32' is bulky and thus causes limitation to the designs of the glasses while failing to provide an aesthetically pleasing appearance. Further, the extent of the positioning member 32' extending into the receptacle 351' of the temple 35' is not fixed. Thus, the jointing position between the positioning member 32' and the temple 35' varies, which is detrimental to quality control in mass production.

SUMMARY OF THE INVENTION

An objective of the present invention is to provide an easy-to-assemble temple assembly for a pair of glasses.

Another objective of the present invention is to provide a reliable temple assembly for a pair of glasses.

A further objective of the present invention is to provide a temple assembly for a pair of glasses with a good appearance.

Still another objective of the present invention is to provide a temple assembly for a pair of glasses with design flexibility.

In accordance with the present invention, a temple assembly for a pair of glasses comprises a temple including a receptacle in an end thereof, a pivotal member, a positioning member, a bolt mounted in the receptacle of the temple for retaining the positioning member, and an elastic element mounted in the receptacle of the temple and having two ends respectively abutting against the positioning member and a head of the bolt.

The pivotal member includes a first end pivotally connected to an end of a frame of a pair of glasses. The pivotal member further includes a second end mounted in the receptacle of the temple and having a reduced section. The positioning member is mounted to the second end of the pivotal member and includes a peripheral edge in tight contact with a perimeter wall delimiting the receptacle of the temple.

The peripheral edge of the positioning member is deformed and provides a firm engagement with the peripheral wall delimiting the receptacle of the temple by flexibility of the peripheral edge of the positioning member. The deformed portion of the peripheral edge of the positioning member is in space above the reduced portion of the pivotal member.

Preferably, the positioning member is made of hard metal.

Preferably, the receptacle of the temple includes a shoulder to which the positioning member abuts against.

Preferably, the hole of the second end of the pivotal member includes a hole, and an end of the bolt extends through the positioning member into the hole of the pivotal member. Preferably, the positioning member includes a hole. The end of the bolt extends through the hole of the positioning member into the hole of the pivotal member. Preferably, the positioning member is sandwiched between an end face of the pivotal member and the shoulder of the receptacle of the temple.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
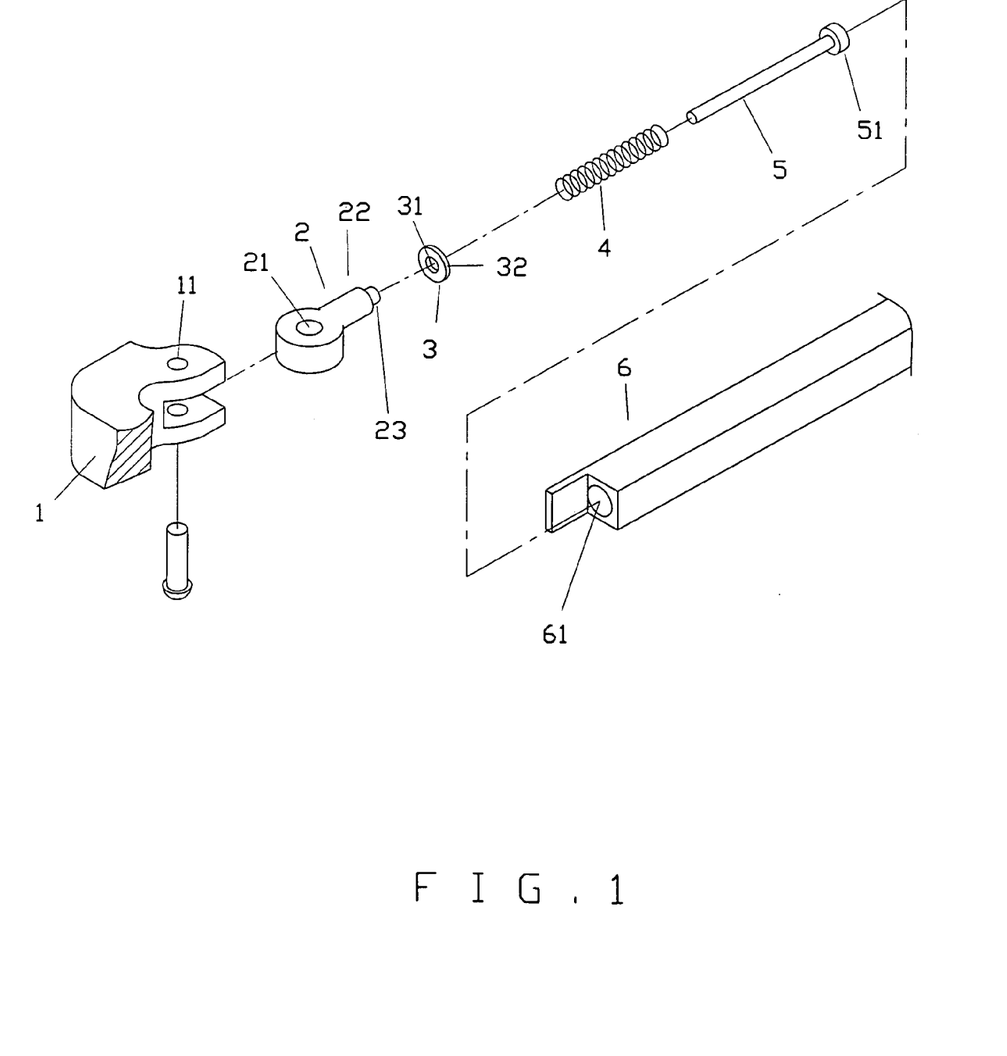
FIG. 1 is an exploded perspective view of a temple assembly for a pair of glasses in accordance with the present invention.

Referring to FIG. 1, a temple assembly for a pair of glasses in accordance with the present invention comprises a pivotal member 2, a positioning member 3, an elastic element 4, a bolt 5, and a temple 5. The pivotal member 2 includes a first end 21 pivotally connected to a pivotal portion 11 on an end of a frame 1 of a pair of glasses. A connecting portion 22 is formed on a second end of the pivotal member 2 for engaging with an end of the bolt 5 that has a head 51 on the other end thereof. The second end of the pivotal member 2 includes a reduced section 23, with a hole 24 (FIG. 2) being defined in the second end of the pivotal member 2 and extending through the reduced section 23.

Figure 2:
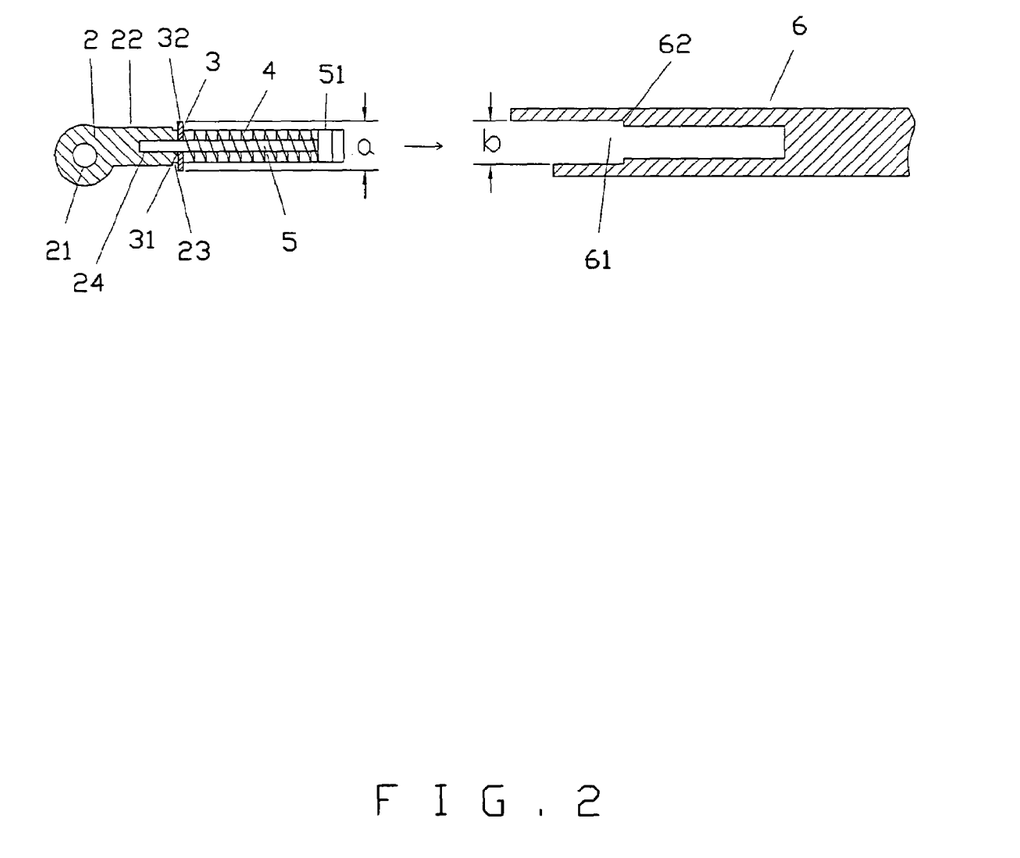
FIG. 2 is an exploded perspective view of the temple assembly in accordance with the present invention.

The positioning member 3 is preferably made of metal and mounted to the second end of the pivotal member 2. As illustrated in FIG. 2, a side of the positioning member 3 abuts against an end face of the reduced section 23, with a hole 31 of the positioning member 3 being aligned with the hole 24 of the pivotal member 2. The end of the bolt 5 is extended through the hole 31 of the positioning member 3 into the hole 24 of the pivotal member 2. The elastic element 4 is mounted around the bolt 5 and includes two ends respectively abutting against the other side of the positioning member 3 and the head 51 of the bolt 5.

The temple 6 includes a receptacle 61 in an end thereof. The receptacle 61 includes a shoulder 62. It is noted that a width "a" of the positioning member 3 is slightly greater than a width "b" of the receptacle 61 of the temple 6, as shown in FIG. 2. In the illustrated embodiment, the positioning member 3 is a disc. Nevertheless, positioning members of other shapes can be used. The positioning member 3 further includes a peripheral edge 32 that is in tight contact with a perimeter wall delimiting the receptacle 61 of the temple 6.

Figure 3:
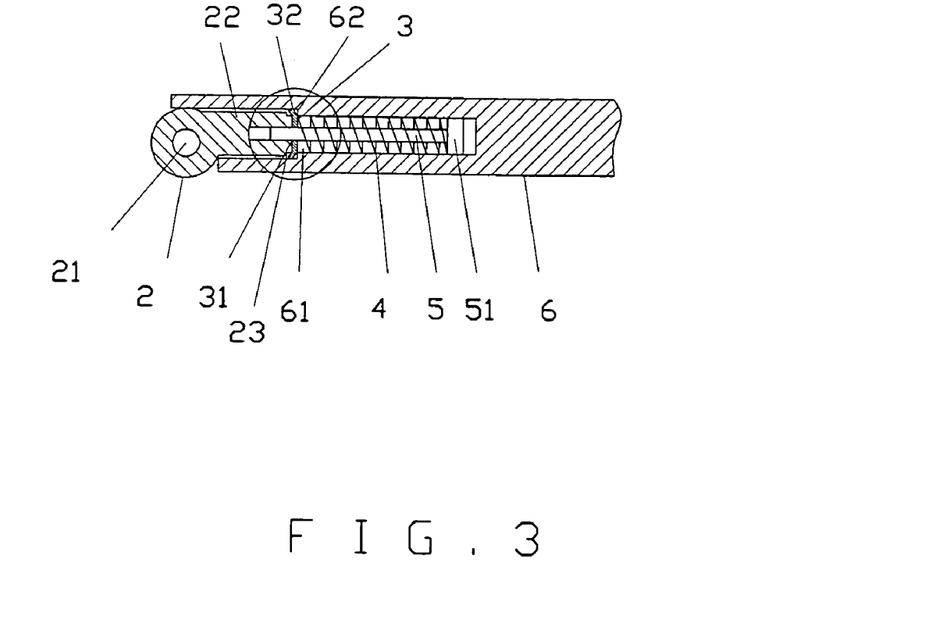
FIG. 3 is a sectional view of the temple assembly in accordance with the present invention.
Figure 3A:
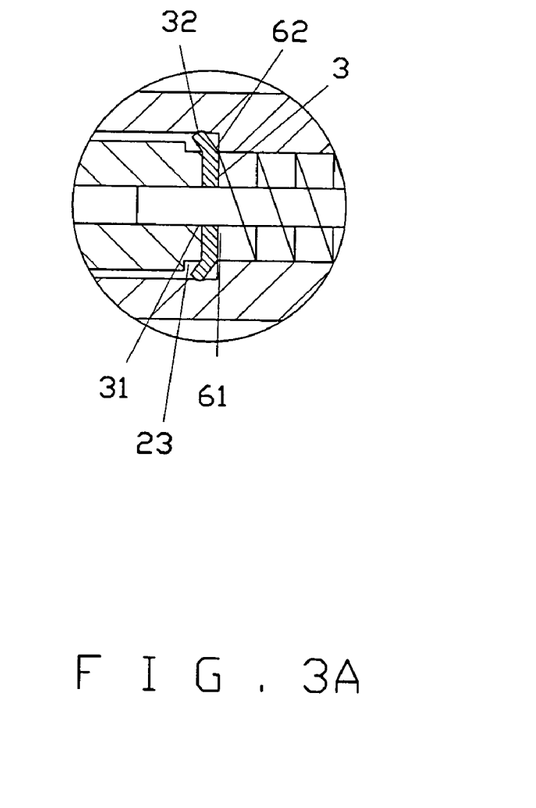
FIG. 3A is an enlarged view of a circled portion in FIG. 3.
Figure 4:
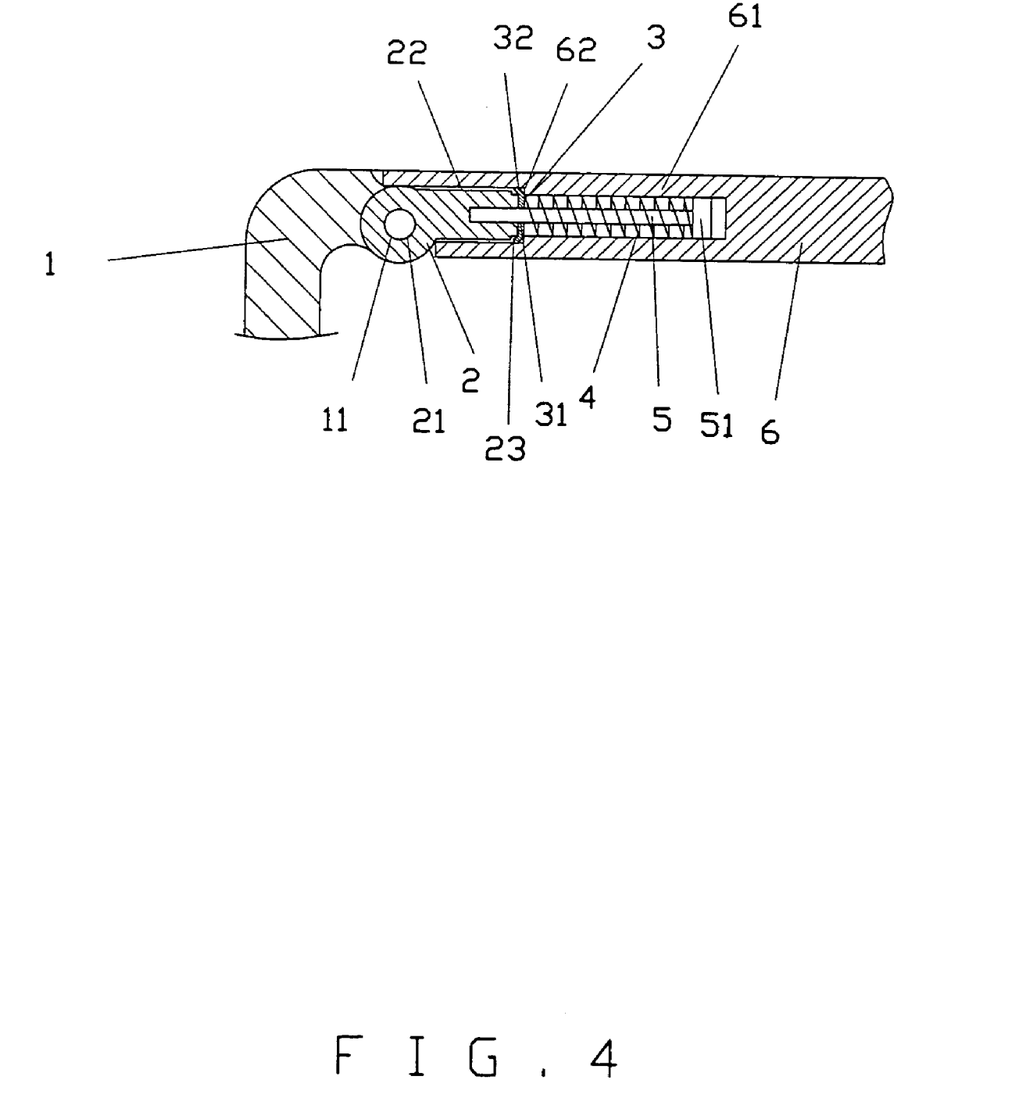
FIG. 4 is a sectional view similar to FIG. 3, wherein the temple assembly is coupled to an end of a frame of a pair of glasses.

Referring to FIGS. 2 through 4, in assembly, the pivotal member 2, the positioning member 3, the elastic element 4, and the bolt 5 are assembled first. Then, the positioning member 3 is forcibly inserted into the receptacle 61 of the temple 6 until the positioning member 3 comes in contact with and is thus stopped by the shoulder 62. During the insertion, the peripheral edge 32 of the positioning member 3 deforms toward the recessed section 23 of the pivotal member 2, best shown in FIG. 3A. The deformed portion of the peripheral edge 32 of the positioning member 3 is in space above the reduced portion 23 of the pivotal member 2. The flexibility of the deformed peripheral edge 32 of the positioning member 3 securely retains the positioning member 3 in the receptacle 61 of the temple 6. It is noted that the positioning member 3 is securely sandwiched between the end face of the second end of the pivotal member 2 and the shoulder 62 of the receptacle 61 of the temple 6.

Figure 5:
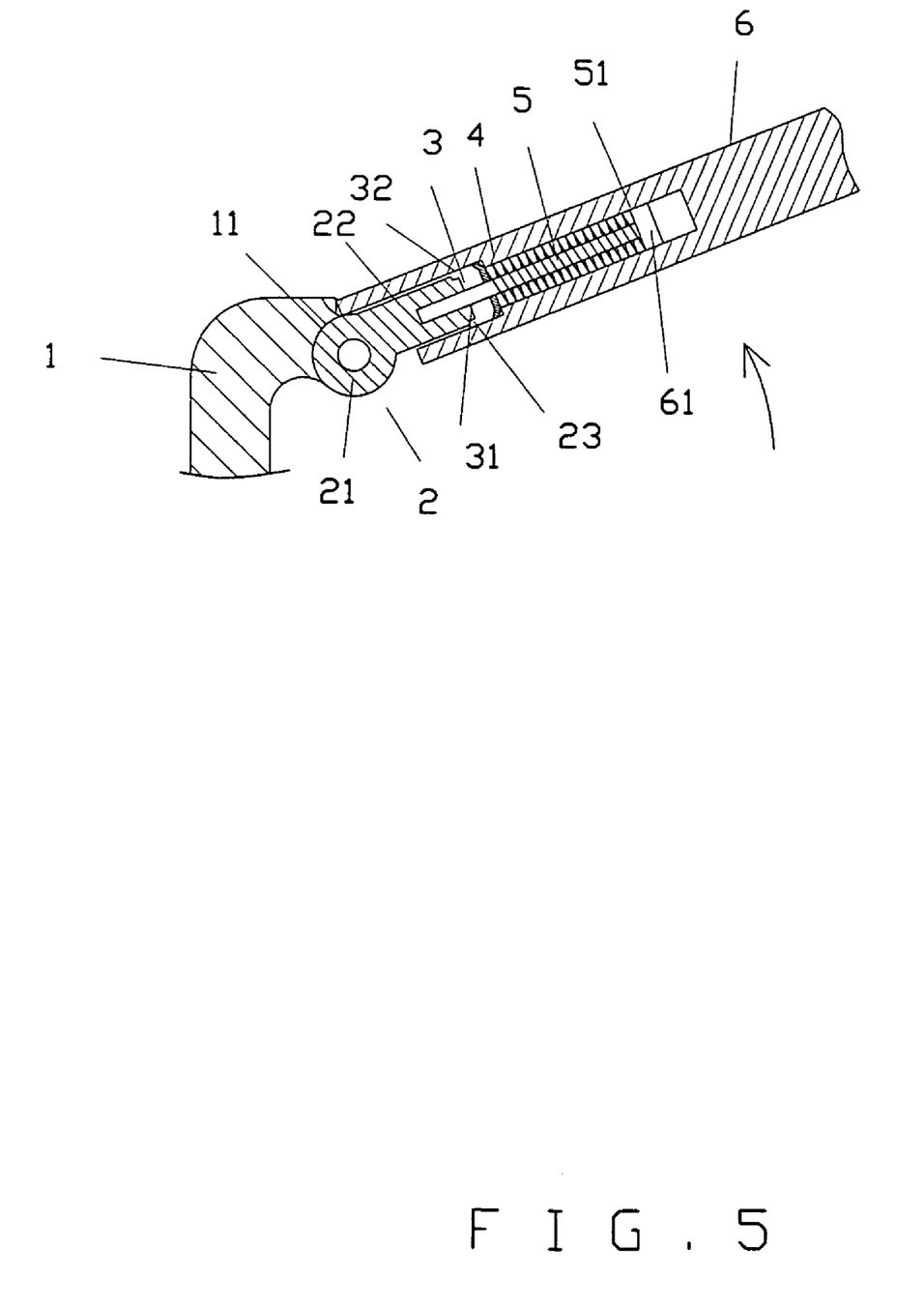
FIG. 5 is a sectional view similar to FIG. 4, illustrating pivotal movement of the temple.

Referring to FIG. 5, when the temple 6 is pivoted, the elastic element 4 is compressed and imparts a force to the peripheral edge 32 of the positioning member 3, resulting in a firmer engagement between the peripheral edge 32 of the positioning member 3 and the perimeter wall delimiting the receptacle 61 of the temple 6. Thus, the elastic element 4 is more reliably supported by the positioning member 3.

Since the positioning member 3 does not receive the pivotal member 1, the width of the positioning member 3 can be minimized as long as an end of the elastic element 4 can abut against the positioning member 3. The width of the receptacle 61 of the temple 6 can be made smaller, allowing design flexibility of the glasses.

Mounting of the positioning member 3 into the receptacle 61 of the temple 6 is easy and convenient, which is advantageous to mass production. Insertion of the positioning member 3 is stopped by the shoulder 62 of the receptacle 61 of the temple 6, which is advantageous to quality control and mass production. Further, the flexibility of the peripheral edge 32 of the positioning member 3 made of harder metal allows reliable fixing of the positioning member 3 to the perimeter wall delimiting the receptacle 61 of the temple 6. Disengagement of the positioning member 3 is prevented. Further, the material for the temple 6 can be made of metal or plastics. The cost for the positioning member 3 is low, and manufacturing of the positioning member 3 is easy, providing an economic design. The temple 6 can be made smaller, as the size of the positioning member 3 is smaller, providing design flexibility of the glasses. No mounting hole is required for the temple 6, providing an aesthetically pleasing appearance.

Although a specific embodiment has been illustrated and described, numerous modifications and variations are still possible without departing from the essence of the invention. The scope of the invention is limited by the accompanying claims.

What is claimed is:

1. A temple assembly for a pair of glasses, comprising:

a temple including a receptacle in an end thereof;

a pivotal member including a first end adapted to be pivotally connected to an end of a frame of a pair of glasses, the pivotal member further including a second end mounted in the receptacle of the temple and having a reduced section;

a positioning member mounted to the second end of the pivotal member, the positioning member including a peripheral edge in tight contact with a perimeter wall delimiting the receptacle of the temple;

a bolt mounted in the receptacle of the temple for retaining the positioning member, the bolt including a head; and an elastic element mounted in the receptacle of the temple and having two ends respectively abutting against the positioning member and the head of the bolt;

wherein the peripheral edge of the positioning member is deformed and provides a firm engagement with the peripheral wall delimiting the receptacle of the temple by flexibility of the peripheral edge of the positioning member, the deformed portion of the peripheral edge of the positioning member being in a space above the reduced portion of the pivotal member.

2. The temple assembly for a pair of glasses as claimed in claim 1 wherein the positioning member is made of hard metal.

3. The temple assembly for a pair of glasses as claimed in claim 1 wherein the receptacle of the temple includes a shoulder to which the positioning member abuts against.

4. The temple assembly for a pair of glasses as claimed in claim 1 wherein the hole of the second end of the pivotal member including a hole, an end of the bolt extending through the positioning member into the hole of the pivotal member.

5. The temple assembly for a pair of glasses as claimed in claim 4 wherein the positioning member includes a hole, the end of the bolt extending through the hole of the positioning member into the hole of the pivotal member.

6. The temple assembly for a pair of glasses as claimed in claim 5 wherein the receptacle of the temple includes a shoulder, the positioning member being sandwiched between an end face of the pivotal member and the shoulder of the receptacle of the temple.

* * * * *